(No Model.)
J. C. LINDSLEY.
FLUID PRESSURE REGULATOR.
No. 538,839. Patented May 7, 1895.
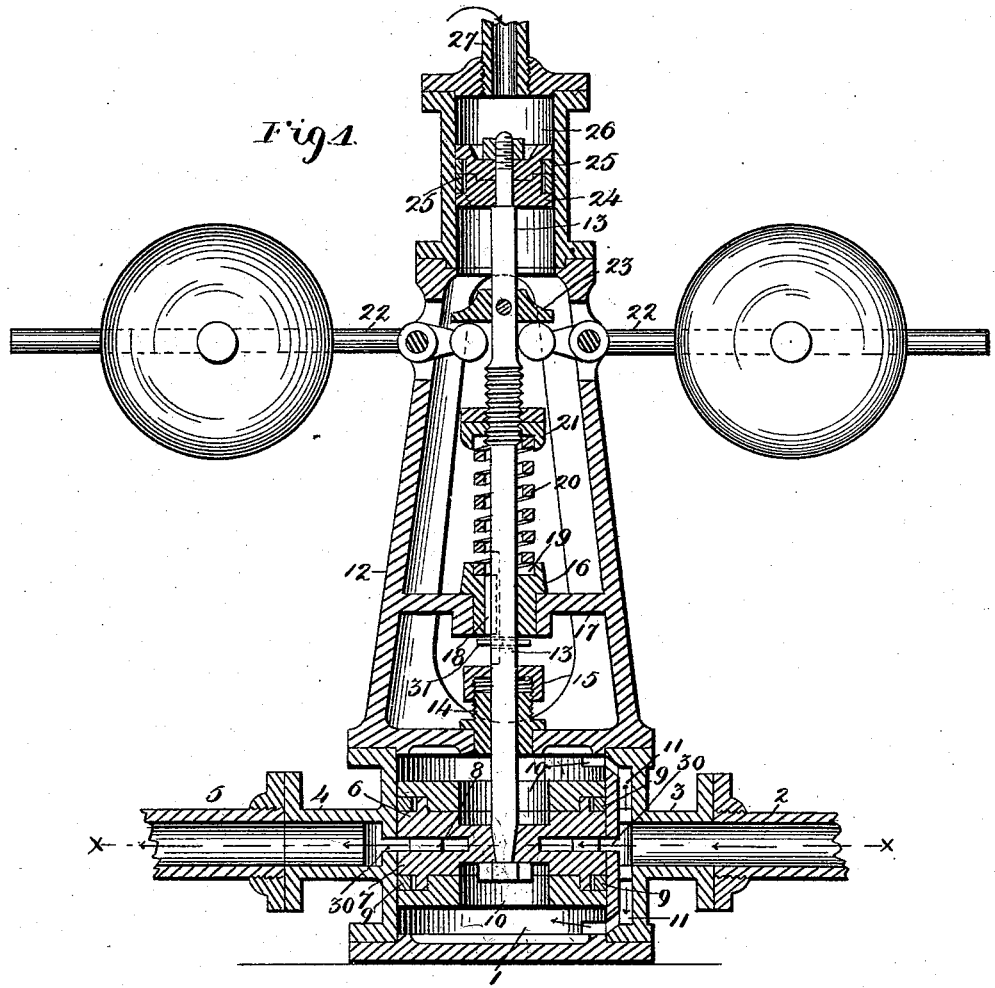
Witnesses
J. P. Vastine
Jno. B. Dempsey
Inventor
J. C. Lindsley
By his Attorneys,
Keller & Starex

UNITED STATES PATENT OFFICE.

JOSEPH C. LINDSLEY, OF ST. LOUIS, MISSOURI, ASSIGNOR OF ONE-HALF TO ROBERT J. HOLLAND, OF SAME PLACE.

FLUID-PRESSURE REGULATOR.

SPECIFICATION forming part of Letters Patent No. 538,839, dated May 7, 1895.

Application filed September 12, 1894. Serial No. 522,779. (No model.)

*To all whom it may concern:*

Be it known that I, JOSEPH C. LINDSLEY, of the city of St. Louis, State of Missouri, have invented certain new and useful Improvements in Fluid-Pressure Regulators, of which the following is a full, clear, and exact description, reference being had to the accompanying drawings, forming a part hereof.

My invention has relation to improvements in fluid-pressure regulators and consists in the novel arrangement and combination of parts more fully set forth in the specification and pointed out in the claims.

In the drawings, Figure 1 is a middle vertical section of my complete invention, and Fig. 2 is a horizontal section taken on the line $x\ x$ of Fig. 1.

The object of my invention is to construct a fluid-pressure regulator which will be simple, durable, effective and responsive to the slightest variations of pressure to which its parts may be subjected.

Referring to the drawings, 1 represents a cylindrical chamber having a pipe connection 2 leading from a suitable boiler, said connection being secured to the pipe section 3 to which it is coupled in any well known manner. Diametrically opposite is a pipe section 4 and the end of a pipe 5 leading to any suitable heating or other fluid system. Within the chamber 1 operates a balanced piston said piston being composed of two sections 6 and 7 which are separated by a space or annular groove 8. Along the periphery of each section and within suitable grooves is placed suitable packing 9 held in place by the annular heads 10. Communication below and above the piston is established through a vertical passage 11 extending on each side of the pipe section 3, the wall at that end of the chamber 1 being made comparatively thicker.

To the upper end of the chamber 1 is secured a supporting casting 12 through the center of which passes a stem 13 whose lower end is secured to the piston in any suitable mechanical manner. The lower portion of the stem passes through a packing nut 14 and cap 15, and the medial portion thereof passes through the guide nut 16 supported on the spider 17 of the casting, the said nut having a groove to receive the feather 18 on the stem 13, this arrangement preventing the stem from turning. The guide nut 16 has a depression 19 at its upper end within which rests the lower end of the encircling spring 20, the upper end of said spring being confined in a suitable depression of the adjusting nut 21 passed over the screw-threaded portion of the stem. The object of the spring is to co-operate with the weights of the regulator to be presently described, and the nut 21 of course is used to adjust the tension of the spring to any required degree. Pivoted within suitable bearings at the upper portion of the casting 12, and located diametrically opposite one another, are weight-carrying arms 22 whose short inner ends bear against the under side of a bearing plate 23 secured at or near the upper end of the stem 13. The extreme upper end of the stem has secured thereto a piston 24 supplied with suitable packing 25, which piston operates within the reduced steam chamber 26 communicating with the fluid system in the path of which the regulator is placed through the pipe connection 27.

It will be seen from the above description that as the steam or other fluid circulates from the boiler through the system it will circulate above and below and around the piston in the chamber 1, so that the said piston will be thoroughly balanced and be responsive to the slightest variations of pressure incident to the system. All variations of pressure in the system will be communicated to the piston operating within the reduced chamber 26. If the pressure becomes too great the piston in the chamber will be depressed, thus depressing the stem 13, and the latter will depress the piston within the chamber 1 causing the groove 8 to pass by the opening 30 leading to the pipe section 4, and thus shut off communication between the boiler and the system. If the pressure in the system becomes reduced too far, then the parts will operate in a reverse direction, again shutting off communication between the boiler and system until such time as the normal pressure of steam or other fluid is restored. The operation of the weighted arms and the coiled spring is too obvious from the drawings to necessitate any lengthy description.

It is obvious of course that the tendency of the weighted arms is to throw the stem 13 upward, and this upward throw would be quite severe if there were no pressure above the piston 24 as must happen before any fire is started in the boiler. Until such time therefore that sufficient pressure has accumulated in the system, I retain the stem and its co-operating parts in their normal position by the pin 31 passed loosely in an opening of the stem immediately below the guide nut 16, the said pin preventing the stem from moving upwardly and the weighted arms 22 from falling. When sufficient pressure in the system has accumulated the pin 31 is removed.

Having described my invention, what I claim is—

1. In a fluid-pressure regulator, a suitable chamber having communication with a fluid generator and system respectively, a balanced piston within said chamber suitable passages for establishing communication between said generator and chamber above and below the piston, a stem secured to the piston, means for guiding the stem, a bearing plate along the upper portion of the stem, weighted pivoted arms co-operating with the bearing plate, an adjusting spring and nut controlling the stem, a piston at the upper end of the stem, and a chamber within which said piston operates and a suitable pipe connection communicating with the system, substantially as set forth.

2. In a fluid-pressure regulator, a suitable stem having a balanced piston secured at one end thereof, a chamber for said piston, a casting mounted on said chamber, a packing nut and cap on said casting, a grooved guide nut supported by the casting, said stem passing through said packing nut, cap, and guide nut, a feather on said stem operating within the groove of the guide nut, said stem having a screw-threaded portion, an adjusting nut passed over said screw-threaded portion, a spring encircling the stem and confined between the adjusting nut and guide nut, a bearing plate above the adjusting nut secured to the stem, weighted arms pivoted in the casting and co-operating with the lower face of the bearing plate, a piston at the upper end of the stem, a reduced chamber within which said piston operates, and a pipe connection leading from said reduced chamber to the system, substantially as set forth.

In testimony whereof I affix my signature in the presence of two witnesses.

JOSEPH C. LINDSLEY.

Witnesses:
C. F. KELLER,
JAMES J. O'DONOHOE.